United States Patent
Parenti

[15] 3,669,136
[45] June 13, 1972

[54] FUEL DELIVERY SYSTEM FOR A PLURALITY OF AIRCRAFT ENGINES

[72] Inventor: Giorgio Parenti, Parma, Italy
[73] Assignee: Siai-Marchetti S.p.A., Varese, Italy
[22] Filed: March 26, 1970
[21] Appl. No.: 23,066

[30] Foreign Application Priority Data

March 25, 1969 Italy.................................14516 A/69

[52] U.S. Cl..............................137/113, 137/112, 137/119
[51] Int. Cl. .........................................................G05d 7/06
[58] Field of Search...................137/112, 109, 114, 113, 119

[56] References Cited

UNITED STATES PATENTS

| | | | |
|---|---|---|---|
| 2,899,969 | 8/1959 | Kirby | 137/113 |
| 2,968,162 | 1/1961 | Acomb | 137/113 |
| 3,126,812 | 3/1964 | Nau | 137/113 |
| 3,322,135 | 5/1967 | Watson | 137/113 |

Primary Examiner—Samuel B. Rothberg
Assistant Examiner—William H. Wright
Attorney—Kurt Kelman

[57] ABSTRACT

In an aircraft, a fuel tank is provided for each engine and a fuel feed pump in each tank feeds fuel from the tank to the associated engine. A fuel ejector in each tank returns fuel to the tank and a fuel conduit connects the fuel pump and fuel ejector to the associated engine. A fuel transfer circuit interconnects the tanks and a normally closed valve therein prevents fuel transfer from one tank to the other. A switch in each tank is responsive to the fuel level therein and opens the valve to transfer fuel when the fuel level in the tank reaches the switch.

3 Claims, 1 Drawing Figure

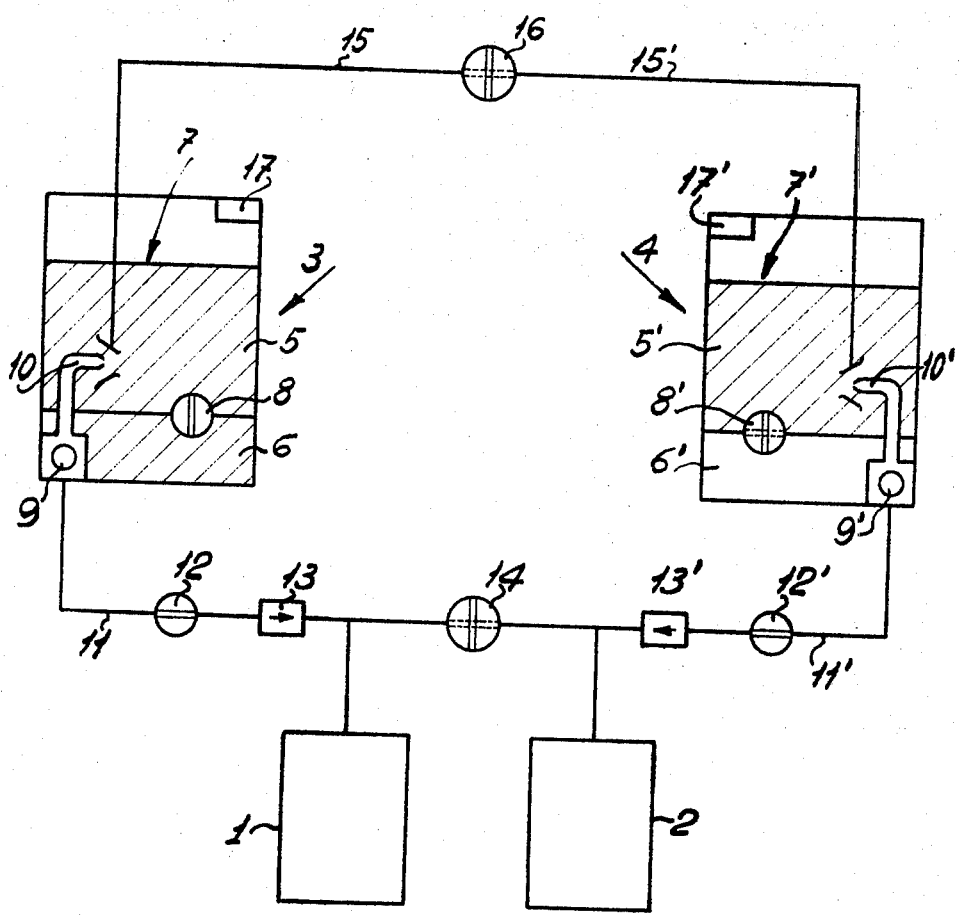

FUEL DELIVERY SYSTEM FOR A PLURALITY OF AIRCRAFT ENGINES

The present invention relates to a fuel delivery system for a plurality of engines of an aircraft, particularly helicopters. It provides major safety and economical features in that one part of the system can service or replace the other part thereof automatically, and a failure of one part cannot endanger the operation of the aircraft owing to a shift in weight.

Most modern aircraft are equipped with a plurality of propelling units. According to prevailing safety rules, each engine unit has its own fuel delivery system operating independently of the other fuel systems in normal use. In exceptional cases, provision has been made for the independent systems to service or replace each other by operation of complicated and expensive means by the crew. The known crew-operated controls present serious troubles as regards safety of the fuel delivery to the engines. Furthermore, particularly in helicopters, emptying of one system located within a part of the aircraft distant from the other system, will create a load imbalance which, in turn will impart the flight trim and performance. It is the primary object of this invention to prevent these difficulties.

For simplicity and clearness of description, the invention is described and illustrated in the single FIGURE of the attached drawing with reference to a fuel delivery system for a twin-engine aircraft but it will be readily appreciated that it may be applied to any desired number of propulsion means in an aircraft.

The present invention provides a fuel delivery system for a plurality of aircraft engines comprising a fuel tank for each engine and a fuel feed pump in each fuel tank for feeding fuel from the tank to the associated engine. Fuel ejector means is arranged in each tank for returning fuel to the tank, and fuel conduit means is arranged between the fuel pump and fuel ejector means and the associated engine. A fuel transfer circuit interconnects the tanks, and there is a valve in the fuel transfer circuit to enable fuel to be transferred from one tank to another. The valve is normally closed to prevent the fuel transfer, and a switch in each tank is responsive to the fuel level therein. The switch opens the valve to transfer fuel when the fuel level in the tank reaches the switch.

In this manner, fuel may flow back and forth between the tanks in case of individual failures, with one of the parts of the system feeding both engines when needed, fuel being automatically transferred between the two parts of the system to keep a constant load distribution at all times.

Referring now to the drawing, there are schematically shown engines 1 and 2 of an aircraft each associated with a respective fuel tank 3 and 4. Fuel tank 3 is divided into an upper fuel tank compartment 5 and a lower fuel tank compartment 6, the fuel level in the tank being indicated by 7, while fuel tank 4 is divided into upper compartment 5', lower compartment 6', with the fuel level indicated by 7'. The upper and lower fuel tank compartments intercommunicate through valve 8 (tank 3) and 8' (tank 4) which may be manually or automatically adjusted by means well known in the art. If desired, the two compartments may be constituted by separate tanks interconnected by pipes and gravity fed.

Each lower compartment is equipped with a fuel feed pump 9, 9' fitted with a fuel ejector 10, 10'. The fuel flows from the upper fuel tank compartment through valve 8, 8' into the lower fuel tank compartment whence the fuel feed pump delivers it into the fuel conduit 11, 11' leading from the fuel pump and fuel ejector to the associated engine. A valve 12, 12' and a check valve 13, 13' are arranged in the fuel conduit to regulate the fuel delivery to the engines. The fuel conduits 11, 11' are interconnected by valve 14.

The fuel ejectors 10, 10' are associated with the respective inlets of fuel transfer circuit lines 15, 15' which are interconnected by solenoid valve 16. A switch 17, 17' is mounted in each upper fuel compartment and is responsive to the level 7, 7' of fuel reached in each tank. When this level reaches the switch, the switch opens the solenoid valve 16 to transfer fuel from the full tank to the other tank. Otherwise, the valve 16 is closed to prevent fuel transfer from one tank to the other.

Valve 14 is of the type responding to pressure at its inlet so that it will open automatically to permit the fuel to flow from the high-pressure side to the lower pressure side of the fuel conduit means.

The system operates as follows:

Under normal operating conditions, valves 14 and 16 are closed (indicated in full lines on the drawing) while valves 8, 8' and 12, 12' are open (as also shown in full lines). Pump 9, 9' are operated to feed the fuel from tanks 3 and 4 respectively to engines 1 and 2. In other words, under these conditions, the system operates like two separate fuel delivery units.

When the pressure in one of the two units fails or is reduced below a standard safety level (for example, the unit feeding engine 2), valve 14 responds to the pressure differential and is automatically opened to establish communication between conduit lines 11 and 11' (see broken lines) so that fuel will flow from the high-pressure side 11 to feed not only engine 1 but, after passing through open valve 14, will also feed engine 2, being prevented from flowing past check valve 13' in line 11'.

In the absence of pressure, a suitable control signal closes valve 8' (see broken lines) to prevent fuel from flowing into lower fuel tank compartment 6', and fuel pump 9' will stop after it has discharged the small amount of fuel in lower fuel tank compartment 6', the empty compartment being indicated by the absence of cross hatching in the drawing.

Under the above conditions, the fuel in tank 3 will be gradually consumed while the fuel remains unchanged in upper fuel tank compartment 5' of tank 4, thus creating a difference in weight distribution which would be dangerous to the performance of the aircraft, particularly in the case of helicopters. According to the invention, the pump 9' will, under these conditions, actuate the fuel ejector 10' which will transfer circuit lines 15, 15' into tank 3, the valve 16 having been opened (see broken lines) by switch 17' in response to the fuel level 7' having reached the switch.

While valves 14 and 16 are automatically opened and closed in accordance with the above description, manual controls for all the valves may also be provided for operation by the pilot of the aircraft. For instance, due to weight dislocations or for other reasons, it may be necessary for a certain period of time to feed both engines by one of the fuel delivery units, which may be done by manual control of valve 14 and/or 16 to open these valves while closing valve 12 or 12'.

While the present invention has been described and illustrated in connection with a now preferred embodiment, it will be obvious that many modifications may occur to those skilled in the art, particularly in connection with individual operating parts of the fuel delivery system which may be replaced by equivalent means functioning in an equivalent manner.

I claim:

1. A fuel delivery system for a plurality of aircraft engines, comprising
   1. a fuel tank for each one of said engines,
   2. a fuel feed pump in each of the tanks for feeding fuel from the tank to the associated engine,
   3. fuel ejector means in each of the tanks for returning fuel to the tank,
   4. fuel conduit means between the fuel pump and fuel ejector means and the associated engine,
   5. a fuel transfer circuit interconnecting the tanks,
   6. a valve in the fuel transfer circuit for transferring fuel from one tank to another, the valve being normally closed to prevent the fuel transfer, and
   7. a switch in each tank responsive to the fuel level therein, the switch opening the valve to transfer fuel when the fuel level in the tank reaches the switch.

2. The fuel delivery system of claim 1, wherein each of said tanks comprises an upper fuel compartment and a lower fuel compartment of smaller capacity, a valve between the fuel compartments for controlling flow of fuel from the upper into the lower compartment, and the fuel feed pump being mounted in the lower compartment.

3. The fuel delivery system of claim 1, further comprising a control valve between the fuel conduit means of each tank, the valve being normally closed and being responsive to pressure differences in the respective fuel conduit means.

* * * * *